United States Patent [19]

Kobayashi et al.

[11] Patent Number: 5,204,428

[45] Date of Patent: Apr. 20, 1993

[54] COPOLYMER AND METHOD OF PRODUCING THE SAME

[75] Inventors: Shiro Kobayashi, 1-302 Kawauchi Zyutaku Daiichi Chiku, Kawauchi, Aoba-ku, Sendai-shi, Miyagi-ken; Yoshihiro Taguchi, Miyagi; Hiroshi Uyama, Tagazyou, all of Japan

[73] Assignees: Alps Electric Co., Ltd., Tokyo; Shiro Kobayashi, Miyagi, both of Japan

[21] Appl. No.: 809,224

[22] Filed: Dec. 16, 1991

Related U.S. Application Data

[63] Continuation of Ser. No. 551,964, Jul. 12, 1990, abandoned.

[30] Foreign Application Priority Data

Aug. 17, 1989 [JP] Japan .................................. 1-211689

[51] Int. Cl.$^5$ .................. C08F 220/50; C08F 220/36; C08F 216/14
[52] U.S. Cl. .................................. 526/298; 526/292.6; 526/292.9; 526/245; 526/247; 526/208; 526/209; 526/213; 526/220
[58] Field of Search .................. 526/292.6, 292.9, 298, 526/245, 247

[56] References Cited

U.S. PATENT DOCUMENTS

| | | | |
|---|---|---|---|
| 2,854,440 | 9/1958 | Kern ..................................... | 526/298 |
| 3,025,279 | 3/1962 | Barr . | |
| 3,488,331 | 1/1970 | Jorgensen, Jr. et al. ......... | 526/292.6 |
| 3,692,754 | 9/1972 | Hirooka et al. .................. | 526/292.6 |
| 3,997,507 | 12/1976 | Kirimoto et al. .............. | 260/63 UY |

*Primary Examiner*—Joseph L. Schofer
*Assistant Examiner*—M. Nagumo
*Attorney, Agent, or Firm*—Guy W. Shoup; David W. Held

[57] ABSTRACT

A copolymer of the present invention is produced by copolymerization of an electron-donating monomer having an electron-accepting group and an electron-accepting monomer having an electron-accepting group. The copolymer thus exhibits a high dielectric constant, a low level of hygroscopicity and good adhesion.

14 Claims, No Drawings

COPOLYMER AND METHOD OF PRODUCING THE SAME

This application is a continuation of application Ser. No. 07/551,964, filed Jul. 12, 1990, now abandoned.

BACKGROUND OF THE INVENTION

The present invention relates to a copolymer with a high dielectric constant which is used in thick film electroluminescence elements and thin capacitors, and to a method of producing the copolymer.

In so-called thick film electroluminescence elements, a luminous layer comprising a polymer matrix and fluorescent powder such as ZnS (Cu) or the like, which is dispersed in the polymer matrix, is used. Cyanoethylated cellulose, cyanoethylated polyvinyl alcohol or the like, which has a high dielectric constant, is used as the polymer matrix from the viewpoint of a decrease in the driving voltage.

However, since conventional polymers such as cyanoethylated polyvinyl alcohol and the like, all of which have high dielectric constants, are produced by a method in which acrylonitrile is reacted with polyvinyl alcohol in the presence of a basic catalyst so as to introduce cyanoethyl groups into polyvinyl alcohol by the substitution of the hydrogen of the hydroxyl groups thereof, 10% or more of the hydroxyl groups necessarily remain unsubstituted in its repeating unit. The conventional polymers with high dielectric constants have a critical problem with respect to their high hygroscopicity due to the residual hydroxyl groups.

It is considered that the polymer used in the luminous layer of a thick film electroluminescence element preferably has a low level of hygroscopicity from the viewpoint of its life of luminescence.

SUMMARY OF THE INVENTION

In order to remove the above problem, the present invention provides a copolymer composed of an electron-donating monomer having an electron-accepting group in its structure and an electron-accepting monomer having an electron-accepting group in its structure, wherein said electron-accepting group is selected from cyanoethyl groups or the like. The copolymer therefore has a high dielectric constant and a low level of hygroscopicity due to the side chains all of which are electron-accepting groups.

DESCRIPTION OF PREFERRED EMBODIMENTS

The present invention is described in detail below.

The electron-donating monomer used in the present invention is a monomer having a vinyl group. Typical examples of such a monomer include vinyl ether monomers expressed by the following formula (1):

$$CH_2=CHOX \quad (1)$$

Monomers in which the functional group X in the formula (1) is an electron-accepting group are used in the present invention.

Examples of such electron-accepting groups that may be used include the typical examples as follows:

—$CH_2CH_2CN$

—$CH_2CF_3$

—$CH_2CH_2CHI$

—$CH_2CH_2OCH_2CH_2CN$

Typical examples of electron-donating monomers, which are used as one of the comonomers of the copolymer of the present invention and each of which has an electron-accepting group, include the following compounds:

$CH_2=CHOCH_2CH_2CN$ $CH_2=CHOCH_2CF_3$ $CH_2=CHOCH_2CH_2Cl$ $CH_2=CHOCH_2CH_2OCH_2CH_2CN$

On the other hand, the electron-accepting monomer having an electron-accepting group used in the present invention is a monomer expressed by the, formula (2) and (3) in which the functional group X has a high level of electron-accepting properties. Examples of such monomers that may be used include acrylate monomers and methacrylate monomers expressed by the following formulae (2) and (3), respectively:

$$CH_2=CHCOOX' \quad (2)$$

$$CH_2=C(CH_3)COOX' \quad (3)$$

Further, monomers, in which each of the functional groups X' in the formulae (2) and (3) is an electron-accepting group, are used in the present invention. Examples of electron-accepting groups include the same as those described above.

Examples of the electron-accepting monomer, which is the other comonomer of the copolymer of the present invention and which has an electron-accepting group, include the typical examples as follows:

$CH_2=CHCOOCH_2CH_2CN$ $CH=CHCOOCH_2CF_3$ $CH_2=C(CH_3)COOCH_2CH_2Cl$

The copolymer of the invention is obtained by radical polymerization of one of the above electron-donating monomers each having an electron-accepting group and one of the above electron-accepting monomers each having an electron-accepting group. Although electron-donating monomers such as vinyl ethers cannot be generally polymerized by radical polymerization and can be polymerized only by cationic polymerization, the combination with electron-accepting monomers enables the radical copolymerization. If one of the above electron-accepting monomers used in the present invention is subjected to cationic polymerization using a cationic catalyst such as boron trifluoride, aluminum chloride or the like, since the polymer obtained is significantly colored, it cannot be practically used in electroluminescence elements.

The radical polymerization can be effected by using a method of the type which is generally used. Examples of polymerization catalysts that may be used include azo compounds such as 2,2'-azobisisobutyronitrile, 2,2'-azobis(2,4-dimethylvaleronitrile), 2,2'-azobis-2-methylbutyronitrile and the like and peroxides such as benzoyl peroxide and the like. The amount of the catalyst used is about 0.5 to 2 mol % relative to the total amount of the monomers used. Examples of polymerization solvents that may be used include acetone, dimethylformamide, esters, ethers and the like. Bulk polymerization using no polymerization solvent can be also made.

Any desired mixing ratio between the electron-donating monomer and the electron-accepting monomer can be appropriately selected up to the maximum of the electron-donating monomer of 50% molar, according to the characteristics of an intended copolymer. As a matter of course, it is possible to mix a mixture of at least one electron-donating monomer and a mixture of at least one electron-accepting monomer. It is also possible to use a third component monomer. Preferable examples of third monomers include acrylates and methacrylates.

The resultant copolymer is a random copolymer or an alternating copolymer.

Since such a copolymer has the side chains all of which are electron-accepting groups, it contains no hydrophilic group such as hydroxyl groups in its repeating unit and thus exhibits a low level of water absorption. In addition, since many electron-accepting groups and electron-donating groups are present in the molecule of the copolymer, the copolymer has a high dielectric constant. The copolymer has excellent adhesion to transparent electrodes made of indium oxide.tin (ITO). The present invention provides a copolymer composed of repeating units of an electron-donating monomer having an electron-accepting group (X) and an electron-accepting monomer having an electron-accepting group (X'), as described before. Either (X) or (X') is a cyanoalkyl group or a cyanoalkyloxyalkyl group. The dielectric constant of a copolymer which has a cyanoalkyl group or a cyanoalkyloxyalkyl group as either electron-accepting group (X) or (X') and has the group shown below as the other electron-accepting group is larger than copolymers which have neither a cyanoalkyl group nor a cyanoalkyloxyalkyl group as (X) or (X')

—CH$_2$CF$_3$

—CH$_2$CH$_2$Cl.

The functional effect of the copolymer is clarified by the description below of examples.

EXAMPLE 1

A nitrogen line was connected to a two-necked flask (100 ml) provided with a cooling tube so that the air in the flask was replaced with nitrogen gas. 0.02 mole of cyanoethyl vinyl ether, which was distilled at least twice, 0.02 mole of cyanoethyl acrylate, 20 ml of acetone and 2,2'-azobisisobutyronitrile in an amount of 2mol% relative to the total amount of the monomers were then placed in the flask, followed by polymerization at 50° C. for 24 hours. The thus-formed copolymer was then reprecipitated by using methanol to obtain 4 g of an intended cyanoethyl vinyl ether-cyanoethyl acrylate copolymer. The composition ratio (cyanoethyl vinyl ether:cyanoethyl acrylate) of the copolymer was 2:3.

EXAMPLE 2

Copolymerization was made by the same method as in Example 1 with the exception that 0.02 mole of β-chloroethyl vinyl ether and 0.02 mole of cyanoethyl acrylate were used to obtain 3.8 g of white powder copolymer of β-chloroethyl vinyl ether-cyanoethyl acrylate.

EXAMPLE 3

Copolymerization was made by the same method as that employed in Example 1 with the exception that 0.02 mole of β-chloroethyl vinyl ether and 0.02 mole of cyanoethyl methacrylate were used to obtain 3.5 g of white power copolymer of β-chloroethyl vinyl ether-cyanomethacrylate.

EXAMPLE 4

Copolymerization was made by the same method as that employed in Example 1 with the exception that 0.02 mole of cyanoethyl vinyl ether and 0.02 mole of cyanoethyl methacrylate were used to obtain 2.1 g of white powder copolymer of cyanoethyl vinyl ether-cyanoethyl methacrylate. The composition ratio (cyanoethyl vinyl ether:cyanoethyl methacrylate) was 1:10.

EXAMPLE 5

Copolymerization was made by the same method as that employed in Example 1 with the exception that 0.015 mole of cyanoethyl vinyl ether and 0.035 mole of cyanoethyl acrylate were used to obtain 3.9 g of white powder copolymer of cyanoethyl vinyl ether-cyanoethyl acrylate. The composition ratio (cyanoethyl vinyl ether:cyanoethyl acrylate) was 1:5.

The dielectric constant (25° C., 1 kHz), hygroscopicity and the content of residual water of each of the copolymers obtained in Examples 1 to 6 were measured.

The content of residual water was measured by the Karl Fischer's method for measuring the content of water remaining in a film which had a thickness of 0.1 mm and which was formed by a method of casting an acetone solution of each of the copolymers, after drying in a vacuum at 100° C. for 24 hours. The coefficient of water absorption, which was measured by allowing the same film to stand for 24 hours at 90 to 95% RH, was considered as hygroscopicity. The adhesion was evaluated by the following cross-cut test:

An ITO transparent electrode was formed on a polyethylene terephthalate film (thickness, 0.2 mm), a film having a thickness of 0.1 mm was formed on the transparent electrode by a casting method. After drying, cuts were made crosswise at intervals of 1 mm in the film, and a cellophane tape was applied to the film and then separated.

The results (except adhesion) are shown in Table 1. Table 1 also shows the test values of the dielectric constant, residual water content and hygroscopicity of a conventional cyanoethylated polyvinyl alcohol. In any one of the cases, the rate of cyanoethylation of cyanoethylated polyvinyl alcohol was about 90%.

The adhesion of each of the copolymers of the present invention was equivalent to that of cyanoethyl vinyl ethercyanoethylated polyvinyl alcohol (test value, 3B–4B).

As described above, the copolymer of the present invention is obtained by the copolymerization of an electron-donating monomer having an electron-accepting group and an electron-accepting monomer having an electron-accepting group. The copolymer thus exhibits a high dielectric constant, a low level of hygroscopicity and good adhesion.

The copolymer of the present invention is therefore suitable for the matrix polymer in the luminous layer of a thick film electroluminescence element and the polymer dielectric substance of a thin capacitor.

TABLE 1

|   | Dielectric constant | Residual water content (wt %) | Hygroscopicity (wt %) |
|---|---|---|---|
| Example |  |  |  |
| 1 | 21.5–21.8 | 0.047–0.078 | 2.3–2.4 |
| 2 | 17.0 | 0.046–0.095 | 2.5–3.0 |
| 3 | 12.4 | 0.045–0.066 | 2.2–2.4 |
| 4 | 10.2 | 0.037–0.052 | 2.1–2.4 |
| 5 | 17.2 | 0.047–0.081 | 2.3–2.4 |
| 6 | 17.7 | 0.035–0.078 | 2.3–2.4 |
| Cyanoethylated polyvinyl alcohol | 14 | 0.1–0.21 | 5.5–9.2 |

What is claimed is:

1. A binary copolymer produced by free radical polymerization of a vinyl ether monomer having a first electron-accepting group and an acrylate monomer having a second electron group wherein
one of said first and second electron-accepting groups is selected from the group consisting of cyanoalkyl and cyanoalkyloxyalkyl groups,
while the other of said first and second electron-accepting groups is selected form the group consisting of cyanoalkyl, cyanoalkyloxyalkyl and haloalkyl groups.

2. A binary copolymer according to claim 1 wherein one of said first and second electron accepting groups is selected from the group consisting of cyanoalkyl and cyanoalkyloxyalkyl groups, while the other of said first and second electron-accepting groups is a haloalkyl group.

3. The copolymer according to claim 1 wherein said acrylate monomer having said second-electron accepting group is a methacrylate monomer.

4. A copolymer according to claim 3, wherein said first electron-accepting group on said vinyl ether monomer is the same as said second electron-accepting group on said methacrylate monomer.

5. A copolymer according to claim 3, wherein one of said first and said second electron-accepting groups is selected from the group consisting of cyanoalkyl and cyanoalkyloxyalkyl groups, while the other of said first and said second electron-accepting groups is a haloalkyl group.

6. A copolymer according to claim 1 wherein said first electron-accepting group on said vinyl ether monomer is the same as said second electron-accepting group on said acrylate monomer.

7. A copolymer according to claim 1 wherein the free radical polymerization is conducted in an organic solvent to be selected from the group consisting of acetone, dimethylformamide, esters, and ethers.

8. A copolymer produced by free radical polymerization of a vinyl ether monomer having a first electron-accepting group and an acrylate monomer having a second electron-accepting group wherein
said first electron-accepting group is selected from the group consisting of cyanoalkyl and cyanoalkyloxyalkyl groups,
while said second electron-accepting group is selected from the group consisting of cyanoalkyloxyalkyl and haloalkyl groups.

9. A copolymer according to claim 8 wherein said first electron-accepting group is selected from the group consisting of cyanoalkyl and cyanoalkyloxyalkyl groups, while said second electron-accepting group is a haloalkyl group.

10. A copolymer according to claim 8 wherein the free radical polymerization is conducted in an organic solvent to be selected from the group consisting of acetone, dimethylformamide, esters, and ethers.

11. The copolymer according to claim 8 wherein said acrylate monomer having said second electron-accepting group is a methacrylate monomer.

12. A copolymer according to claim 11, wherein said first electron-accepting group on said vinyl ether monomer is the same as said second electron-accepting group on said methacrylate monomer.

13. A copolymer according to claim 11, wherein said first electron-accepting group is selected from the group consisting of cyanoalkyl and cyanoalkyloxyalkyl groups, while said second electron-accepting group is a haloalkyl group.

14. A copolymer according to claim 8 wherein said first electron-accepting group on said vinyl ether monomer is the same as said electron-accepting group on said acrylate monomer.

* * * * *